United States Patent
Zhang et al.

(10) Patent No.: US 12,000,065 B2
(45) Date of Patent: Jun. 4, 2024

(54) METHOD FOR PREPARING PET/PTT PARALLEL COMPLEX FILAMENT WITH HIGH SELF-CRIMPINESS

(71) Applicants: TONGKUN GROUP CO., LTD., Zhejiang (CN); ZHEJIANG SCI-TECH UNIVERSITY, Zhejiang (CN)

(72) Inventors: Xuzhen Zhang, Zhejiang (CN); Wenxing Chen, Zhejiang (CN); Yanlin Sun, Zhejiang (CN); Xiuhua Wang, Zhejiang (CN); Shaobo Liu, Zhejiang (CN); Xueyan Lin, Zhejiang (CN); Shunli Xiao, Zhejiang (CN)

(73) Assignees: TONGKUN GROUP CO., LTD., Zhejiang (CN); ZHEJIANG SCI-TECH UNIVERSITY, Zhejiang (CN)

( * ) Notice: Subject to any disclaimer, the term of this patent is extended or adjusted under 35 U.S.C. 154(b) by 310 days.

(21) Appl. No.: 17/603,578

(22) PCT Filed: Aug. 25, 2020

(86) PCT No.: PCT/CN2020/111105
§ 371 (c)(1),
(2) Date: Oct. 13, 2021

(87) PCT Pub. No.: WO2021/037028
PCT Pub. Date: Mar. 4, 2021

(65) Prior Publication Data
US 2022/0205141 A1    Jun. 30, 2022

(30) Foreign Application Priority Data
Aug. 27, 2019    (CN) .......................... 201910793595.3

(51) Int. Cl.
| | | |
|---|---|---|
| *D01D 5/088* | (2006.01) | |
| *B29B 13/06* | (2006.01) | |
| *D01D 5/092* | (2006.01) | |
| *D01D 5/096* | (2006.01) | |
| *D01D 5/12* | (2006.01) | |
| *D01D 5/22* | (2006.01) | |
| *D01D 5/32* | (2006.01) | |
| *D01D 7/00* | (2006.01) | |
| *D01D 10/02* | (2006.01) | |
| *D01D 10/04* | (2006.01) | |
| *D01D 10/06* | (2006.01) | |
| *D01F 8/14* | (2006.01) | |
| *D02G 1/00* | (2006.01) | |
| *D02J 1/22* | (2006.01) | |
| *D02J 13/00* | (2006.01) | |
| *B29B 9/16* | (2006.01) | |

(52) U.S. Cl.
CPC ............ *D01D 5/22* (2013.01); *B29B 13/065* (2013.01); *D01D 5/32* (2013.01); *D01D 10/02* (2013.01); *D01D 10/0409* (2013.01); *D01D 10/06* (2013.01); *D01F 8/14* (2013.01); *D02G 1/004* (2013.01); *D02J 1/228* (2013.01); *D02J 13/003* (2013.01); *D02J 13/005* (2013.01); *B29B 2009/165* (2013.01); *D10B 2331/04* (2013.01)

(58) Field of Classification Search
CPC ...................... B29B 2009/165; B29B 13/065; D01D 5/088; D01D 5/092; D01D 5/096; D01D 5/12; D01D 5/16; D01D 5/22; D01D 5/32; D01D 7/00; D01D 10/02; D01D 10/0409; D01D 10/06; D01F 8/14; D02G 1/004; D02J 1/22; D02J 1/228; D02J 13/00; D02J 13/003; D02J 13/005
USPC ............ 264/140, 168, 172.14, 210.4, 210.5, 264/210.7, 210.8, 211.12, 211.14, 211.15, 264/211.17, 211.22, 211.23
See application file for complete search history.

(56) References Cited

U.S. PATENT DOCUMENTS

| | | | | |
|---|---|---|---|---|
| 6,139,954 | A * | 10/2000 | Dean .......................... | D01F 8/14 525/445 |
| 2002/0025433 | A1* | 2/2002 | Chang ..................... | D01D 5/092 264/172.14 X |
| 2003/0052436 | A1* | 3/2003 | Koyanagi ................. | D01F 8/14 264/178 R |
| 2004/0214984 | A1* | 10/2004 | Keep ....................... | C08L 67/02 528/359 |

FOREIGN PATENT DOCUMENTS

CN    201510570077.7    9/2015

* cited by examiner

*Primary Examiner* — Leo B Tentoni
(74) *Attorney, Agent, or Firm* — Jeenam Park

(57) ABSTRACT

The present invention discloses a method for preparing a PET/PTT parallel complex filament with high self-crimpiness, wherein PET and PTT are sliced, dried and crystallized, and then fused separately and subjected to extrusion molding through a parallel-type spinneret plate; oil is applied after cooling; then level 1-3 drafting and heat setting treatment are adopted; and during drafting, a total drafting rate is controlled to be 3 to 3.5, wherein the level-1 drafting rate is 2.8 to 3.0 at a temperature controlled to be 75 to 80° C., according to the method for preparing the PET/PTT parallel complex filament with high self-crimpiness, methods like multi-level drafting for increasing the drafting rate are adopted, and the effects of improving the fiber strength, moderately lowering the breaking elongation, and greatly improving the self-crimpiness are achieved.

9 Claims, No Drawings

METHOD FOR PREPARING PET/PTT PARALLEL COMPLEX FILAMENT WITH HIGH SELF-CRIMPINESS

TECHNICAL FIELD

The present invention relates to the field of chemical fibers, in particular to a method for preparing a PET/PTT parallel complex filament with high self-crimpiness.

BACKGROUND ART

Presently, a great amount of chemical fiber are produced in China, but accompanied by serious homogeneity and isomorphism phenomena. Complex fibers as an important category in the current differentiated fibers are of a new variety of chemical fibers developed in the 1960s, wherein a parallel complex fiber as a complex variety in which two components exist in parallel and are only partially adhered is a new variety developed by using a principle of bionics based on an inherent crimping mechanism of wool. PET/PTT parallel complex fiber is a complex fiber with spontaneous crimping obtained by melt complex spinning by using a difference in shrinkage rate between PTT and PET, and due to relatively low cost, it has gradually been applied commercially.

At present, the industrial production of the PET/PTT parallel complex fiber in China is still in its infancy. Many domestic manufacturers are suffering from the problems such as blind obedience and unclear fiber performances. The PET/PTT parallel complex fiber products generally have a series of problems such as poor comprehensive performances, uneven quality, and confusion in standard requirements. For example, although many documents and patents mention that the crimp shrinkage rate is up to more than 80%, it is difficult to measure this index uniformly due to the inconsistence in test standards. According to an industrialized testing method for the elasticity of a PTT/PET self-crimped filament proposed by the patent ZL201510570077.7, at present, the crimp recovery rate of the PET/PTT parallel complex fibers at home and abroad is only less than 40%, and hardly reaches 45%, such that the self-crimping ability is limited, which is difficult to meet the subsequent fabric needs. The fundamental reasons lie in that: two components of PET and PTT are greatly different in melting point and melt viscosity (PET has a melting point of 260° C. and low melt viscosity, while PTT has a melting point of 225° C. and high melt viscosity, and is easy to degrade at high temperature); a drafting ratio is hardly increased (generally 1 to 2.5 times, but too high drafting rate will result in poor stability); a winding rate is low (less than 3500 m/min); and a linear density is high (the linear density is generally 4 to 5 dtex), and many other factors.

SUMMARY OF THE INVENTION

The technical problem to be solved by the present invention is to provide a method for preparing a PET/PTT parallel complex filament with high self-crimpiness, which would increases fiber strength, moderately lowers the breaking elongation and greatly improves self-crimping property by reasonably selecting a viscosity ratio of two components, reduces content of the PTT component, and increases drafting rate by using multi-level drafting, etc.

The technical solution of the present invention is to provide a method for preparing a PET/PTT parallel complex filament with high self-crimpiness, wherein PET and PTT are sliced, dried and crystallized, and then fused separately and subjected to extrusion molding through a parallel-type spinneret plate; oil is applied after cooling; then level 1-3 drafting and heat setting treatment are adopted; and during drafting, a total drafting rate is controlled to be 3 to 3.5, wherein the level-1 drafting rate is 2.8 to 3.0 at a temperature controlled to be 75 to 80° C., and the drafting rates of the remaining levels are 1.0 to 1.5 respectively at a temperature of 75 to 80° C.; the drafted filaments are subjected to dynamic heat setting treatment to obtain the PET/PTT parallel complex filament with high self-crimpiness, wherein an intrinsic viscosity of the PET raw material is 0.60 to 0.65 dL/g, an intrinsic viscosity of the PTT raw material is 0.90 to 0.96 dL/g, and a spinning temperature of the spinning molding is 270 to 275° C.; a winding rate of the fiber is 3600 to 3900 m/min; the dynamic heat setting refers that the filament is wound on a rotating heat roller or passed through a high-temperature hot plate to obtain transient setting; and the dynamic heat setting is performed at a temperature of 152 to 156° C. for 20s to 30s.

The PET/PTT parallel complex filament with high self-crimpiness prepared in the present invention has a monofilament linear density of 2 to 3 dtex, a breaking strength of 3.2 to 3.5 cN/dtex, a breaking elongation of 25 to 45%, an elastic recovery rate of 40 to 45%, and a crimping rate of 45 to 49%. The PET/PTT parallel complex filament with high self-crimpiness has the performance indices much higher than a PET/PTT parallel complex filament product, which is widely applied in the market at present and has a breaking strength of 2.5 to 3.0 cN/dtex, an elastic recovery rate of less than 40% under the same conditions, and a crimping rate of less than 45%.

Preferably, when the PET and PTT are subjected to melt extrusion and spinning molding, the two raw materials are metered by their respective melt metering pumps through independent and separate conveying and melting screws, then fed into the same spinning box at a mass ratio of PET to PTT of 55:45 at 270 to 275° C., and sprayed into filaments from a spinneret plate, wherein the used complex spinneret plate is a separated-type double-hole structure with a diameter of 0.3 mm, a length-to-diameter ratio of 2.5, and a control component pressure of 20 to 100 kgf/cm$^2$. Based on a mass ratio of PET to PTT of 55:45 (50:50 in most of the current commercialized similar products), the amount of PTT in the parallel fiber is effectively reduced, which facilitates reducing the cost.

Preferably, the PET/PTT parallel complex filament with high self-crimpiness has a monofilament linear density of 2 to 3 dtex, a breaking strength of 3.2 to 3.5 cN/dtex, a breaking elongation of 25 to 45%, an elastic recovery rate of 40 to 45%, and a crimping rate of 45 to 49%, with superior performance.

Preferably, the intrinsic viscosity of the PET raw material is 0.63 dL/g, and the intrinsic viscosity of the PTT raw material is 0.95 dL/g; the two raw materials are dried and pre-crystallized in a drying tower, and then subjected to melt extrusion and spinning molding; the two raw materials are metered by their respective melt metering pumps through independent and separate conveying and melting screws, then fed into the same spinning box at a mass ratio of PET to PTT of 55:45 at 274° C., and sprayed into filaments from the spinneret plate, wherein the used complex spinneret plate has a separated-type double-hole structure with a diameter of 0.3 mm, a length-to-diameter ratio of 2.5, and a control component pressure of 90 kgf/cm$^2$; nascent fiber is cooled and then oiled, and subjected to drafting treatment; a protofilament is subjected to two-level drafting with a total drafting ratio of 3.5, wherein the level-1 drafting rate of 2.8 is achieved at 77° C., and the level-2 drafting rate of 1.25 is achieved at 80° C.; the drafted filament is then subjected to dynamic heat setting treatment at a heat setting temperature of 156° C. for 20s; and the final fiber is wound at 3800 m/min.

Preferably, the intrinsic viscosity of the PET raw material is 0.60 dL/g, and the intrinsic viscosity of the PTT raw material is 0.90 dL/g; the two raw materials are dried and pre-crystallized in a drying tower, and then subjected to melt extrusion and spinning molding; the two raw materials are metered by their respective melt metering pumps through independent and separate conveying and melting screws, then fed into the same spinning box at a mass ratio of PET to PTT of 55:45 at 270° C., and sprayed into filaments from the spinneret plate, wherein the used complex spinneret plate has a separated-type double-hole structure with a diameter of 0.3 mm, a length-to-diameter ratio of 2.5, and a control component pressure of 20 kgf/cm$^2$; nascent fiber is cooled and then oiled, and subjected to drafting treatment; a protofilament is subjected to two-level drafting with a total drafting ratio of 3, wherein the level-1 drafting rate of 2.8 is achieved at 75° C., and the level-2 drafting rate of 1.07 is achieved at 80° C.; the drafted filament is then subjected to dynamic heat setting treatment at a heat setting temperature of 152° C. for 20s; and the final fiber is wound at 3600 m/min.

Preferably, the intrinsic viscosity of the PET raw material is 0.65 dL/g, and the intrinsic viscosity of the PTT raw material is 0.96 dL/g; the two raw materials are dried and pre-crystallized in a drying tower, and then subjected to melt extrusion and spinning molding; the two raw materials are metered by their respective melt metering pumps through independent and separate conveying and melting screws, then fed into the same spinning box at a mass ratio of PET to PTT of 55:45 at 275° C., and sprayed into filaments from the spinneret plate, wherein the used complex spinneret plate has a separated-type double-hole structure with a diameter of 0.3 mm, a length-to-diameter ratio of 2.5, and a control component pressure of 100 kgf/cm$^2$; nascent fiber is cooled and then oiled, and subjected to drafting treatment; a protofilament is subjected to two-level drafting with a total drafting ratio of 3.5, wherein the level-1 drafting rate of 3.22 is achieved at 80° C., and the level-2 drafting rate of 1.09 is achieved at 80° C.; the drafted filament is then subjected to dynamic heat setting treatment at a heat setting temperature of 156° C. for 30s; and the final fiber is wound at 3900 m/min.

Preferably, the intrinsic viscosity of the PET raw material is 0.63 dL/g, and the intrinsic viscosity of the PTT raw material is 0.92 dL/g; the two raw materials are dried and pre-crystallized in a drying tower, and then subjected to melt extrusion and spinning molding; the two raw materials are metered by their respective melt metering pumps through independent and separate conveying and melting screws, then fed into the same spinning box at a mass ratio of PET to PTT of 55:45 at 273° C., and sprayed into filaments from the spinneret plate, wherein the used complex spinneret plate has a separated-type double-hole structure with a diameter of 0.3 mm, a length-to-diameter ratio of 2.5, and a control component pressure of 80 kgf/cm$^2$; nascent fiber is cooled and then oiled, and subjected to drafting treatment; a protofilament is subjected to three-level drafting with a total drafting ratio of 3.5, wherein the level-1 drafting rate of 3.1 is achieved at 75° C., the level-2 drafting rate of 1.1 is achieved at 78° C., and the level-3 drafting rate of 1.03 is achieved at 80° C.; the drafted filament is then subjected to dynamic heat setting treatment at a heat setting temperature of 154° C. for 25s; and the final fiber is wound at 3700 m/min.

Further, the intrinsic viscosity of the PET raw material is 0.64 dL/g, and the intrinsic viscosity of the PTT raw material is 0.95 dL/g; the two raw materials are dried and pre-crystallized in a drying tower, and then subjected to melt extrusion and spinning molding; the two raw materials are metered by their respective melt metering pumps through independent and separate conveying and melting screws, then fed into the same spinning box at a mass ratio of PET to PTT of 55:45 at 274° C., and sprayed into filaments from the spinneret plate, wherein the used complex spinneret plate has a separated-type double-hole structure with a diameter of 0.3 mm, a length-to-diameter ratio of 2.5, and a control component pressure of 60 kgf/cm$^2$; nascent fiber is cooled and then oiled, and subjected to drafting treatment; a protofilament is subjected to level-1 drafting with a drafting ratio of 3.5; the drafted filament is then subjected to dynamic heat setting treatment at a heat setting temperature of 153° C. for 22s; and the final fiber is wound at 3800 m/min.

Further, the intrinsic viscosity of the PET raw material is 0.62 dL/g, and the intrinsic viscosity of the PTT raw material is 0.93 dL/g; the two raw materials are dried and pre-crystallized in a drying tower, and then subjected to melt extrusion and spinning molding, the two raw materials are metered by their respective melt metering pumps through independent and separate conveying and melting screws, then fed into the same spinning box at a mass ratio of PET to PTT of 55:45 at 275° C., and sprayed into filaments from the spinneret plate, wherein the used complex spinneret plate has a separated-type double-hole structure with a diameter of 0.3 mm, a length-to-diameter ratio of 2.5, and a control component pressure of 70 kgf/cm$^2$; nascent fiber is cooled and then oiled, and subjected to drafting treatment; a protofilament is subjected to two-level drafting with a total drafting ratio of 3.4, wherein the level-1 drafting rate of 3.05 is achieved at 78° C., and the level-2 drafting rate of 1.11 is achieved at 80° C.; the drafted filament is then subjected to dynamic heat setting treatment at a heat setting temperature of 155° C. for 23s; and the final fiber is wound at 3900 m/min.

Compared with the prior art, the present invention adopting the above schemes has the following advantages: by reasonably selecting a viscosity ratio of the two components and increasing the drafting ratio of the PET/PTT complex fiber, the generation of a moment difference between the two components of the fiber is ensured to promote the improvement of the mechanical properties and self-crimping properties of the fiber (the breaking strength is 3.2 to 3.5 cN/dtex, the breaking elongation is 25 to 45%, the elastic recovery rate is 40 to 45%, and the crimping rate is 45 to 49%); a winding rate is increased to 3600 to 3900 m/min to improve the production efficiency. This technical scheme can better meet the needs of industrial applications.

DETAILED DESCRIPTIONS OF THE PREFERRED EMBODIMENTS

The present invention will be further described below in conjunction with the specific embodiments.

Embodiment 1

A method for preparing a PET/PTT parallel complex filament with high self-crimpiness is provided. An intrinsic viscosity of a PET raw material is 0.60 dL/g, and an intrinsic viscosity of a PTT raw material is 0.90 dL/g. The two raw materials are dried and pre-crystallized in a drying tower, and then subjected to melt extrusion and spinning molding. The two raw materials are metered by their respective melt metering pumps through independent and separate conveying and melting screws, then fed into the same spinning box at a mass ratio of PET to PTT of 55:45 at 270° C., and sprayed into filaments from a spinneret plate. The used complex spinneret plate has a separated-type double-hole structure with a diameter of 0.3 mm, a length-to-diameter ratio of 2.5, and a control component pressure of 20 kgf/cm$^2$. Nascent fiber is cooled and then oiled, and subjected to drafting treatment. A protofilament is subjected to two-level drafting with a total drafting ratio of 3, wherein the level-1 drafting rate of 2.8 is achieved at 75° C., and the level-2 drafting rate of 1.07 is achieved at 80° C. The drafted filament is then subjected to dynamic heat setting treatment at a heat setting temperature of 152° C. for 20s. The final fiber is wound at 3600 m/min.

The PET/PTT parallel complex filament prepared by using the above process has a monofilament linear density of 2 dtex, a breaking strength of 3.2 cN/dtex, a breaking elongation of 45%, an elastic recovery rate of 40%, and a crimping rate of 45%.

Embodiment 2

An intrinsic viscosity of a PET raw material is 0.65 dL/g, and an intrinsic viscosity of a PTT raw material is 0.96 dL/g. The two raw materials are dried and pre-crystallized in a drying tower, and then subjected to melt extrusion and spinning molding. The two raw materials are metered by their respective melt metering pumps through independent and separate conveying and melting screws, then fed into the same spinning box at a mass ratio of PET to PTT of 55:45 at 275° C., and sprayed into filaments from a spinneret plate. The used complex spinneret plate has a separated-type double-hole structure with a diameter of 0.3 mm, a length-to-diameter ratio of 2.5, and a control component pressure of 100 kgf/cm$^2$. Nascent fiber is cooled and then oiled, and subjected to drafting treatment. A protofilament is subjected to two-level drafting with a total drafting ratio of 3.5, wherein the level-1 drafting rate of 3.22 is achieved at 80° C., and the level-2 drafting rate of 1.09 is achieved at 80° C. The drafted filament is then subjected to dynamic heat setting treatment at a heat setting temperature of 156° C. for 30s. The final fiber is wound at 3900 m/min.

The PET/PTT parallel complex filament prepared by using the above process has a monofilament linear density of 3 dtex, a breaking strength of 3.3 cN/dtex, a breaking elongation of 40%, an elastic recovery rate of 45%, and a crimping rate of 49%.

Embodiment 3

An intrinsic viscosity of a PET raw material is 0.63 dL/g, and an intrinsic viscosity of a PTT raw material is 0.92 dL/g. The two raw materials are dried and pre-crystallized in a drying tower, and then subjected to melt extrusion and spinning molding. The two raw materials are metered by their respective melt metering pumps through independent and separate conveying and melting screws, then fed into the same spinning box at a mass ratio of PET to PTT of 55:45 at 273° C., and sprayed into filaments from a spinneret plate. The used complex spinneret plate has a separated-type double-hole structure with a diameter of 0.3 mm, a length-to-diameter ratio of 2.5, and a control component pressure of 80 kgf/cm$^2$. Nascent fiber is cooled and then oiled, and subjected to drafting treatment. A protofilament is subjected to three-level drafting with a total drafting ratio of 3.5, wherein the level-1 drafting rate of 3.1 is achieved at 75° C., the level-2 drafting rate of 1.1 is achieved at 78° C., and the level-3 drafting rate of 1.03 is achieved at 80° C. The drafted filament is then subjected to dynamic heat setting treatment at a heat setting temperature of 154° C. for 25s. The final fiber is wound at 3700 m/min.

The PET/PTT parallel complex filament prepared by using the above process has a monofilament linear density of 2.4 dtex, a breaking strength of 3.5 cN/dtex, a breaking elongation of 25%, an elastic recovery rate of 45%, and a crimping rate of 46%.

Embodiment 4

An intrinsic viscosity of a PET raw material is 0.64 dL/g, and an intrinsic viscosity of a PTT raw material is 0.95 dL/g. The two raw materials are dried and pre-crystallized in a drying tower, and then subjected to melt extrusion and spinning molding. The two raw materials are metered by their respective melt metering pumps through independent and separate conveying and melting screws, then fed into the same spinning box at a mass ratio of PET to PTT of 55:45 at 274° C., and sprayed into filaments from a spinneret plate. The used complex spinneret plate has a separated-type double-hole structure with a diameter of 0.3 mm, a length-to-diameter ratio of 2.5, and a control component pressure of 60 kgf/cm$^2$. Nascent fiber is cooled and then oiled, and subjected to drafting treatment. A protofilament is subjected to level-1 drafting with a drafting ratio of 3.5. The drafted filament is then subjected to dynamic heat setting treatment at a heat setting temperature of 153° C. for 22s. The final fiber is wound at 3800 m/min.

The PET/PTT parallel complex filament prepared by using the above process has a monofilament linear density of 2.8 dtex, a breaking strength of 3.4 cN/dtex, a breaking elongation of 42%, an elastic recovery rate of 41%, and a crimping rate of 47%.

Embodiment 5

An intrinsic viscosity of a PET raw material is 0.62 dL/g, and an intrinsic viscosity of a PTT raw material is 0.93 dL/g. The two raw materials are dried and pre-crystallized in a drying tower, and then subjected to melt extrusion and spinning molding. The two raw materials are metered by their respective melt metering pumps through independent and separate conveying and melting screws, then fed into the same spinning box at a mass ratio of PET to PTT of 55:45 at 275° C., and sprayed into filaments from a spinneret plate. The used complex spinneret plate has a separated-type double-hole structure with a diameter of 0.3 mm, a length-to-diameter ratio of 2.5, and a control component pressure of 70 kgf/cm$^2$. Nascent fiber is cooled and then oiled, and subjected to drafting treatment. A protofilament is subjected to two-level drafting with a total drafting ratio of 3.4, wherein the level-1 drafting rate of 3.05 is achieved at 78° C., and the level-2 drafting rate of 1.11 is achieved at 80° C. The drafted filament is then subjected to dynamic heat setting treatment at a heat setting temperature of 155° C. for 23s. The final fiber is wound at 3900 m/min.

The PET/PTT parallel complex filament prepared by using the above process has a monofilament linear density of 2.6 dtex, a breaking strength of 3.4 cN/dtex, a breaking elongation of 45%, an elastic recovery rate of 42%, and a crimping rate of 46%.

Embodiment 6

An intrinsic viscosity of a PET raw material is 0.63 dL/g, and an intrinsic viscosity of a PTT raw material is 0.95 dL/g. The two raw materials are dried and pre-crystallized in a drying tower, and then subjected to melt extrusion and spinning molding. The two raw materials are metered by their respective melt metering pumps through independent and separate conveying and melting screws, then fed into the same spinning box at a mass ratio of PET to PTT of 55:45 at 274° C., and sprayed into filaments from a spinneret plate. The used complex spinneret plate has a separated-type double-hole structure with a diameter of 0.3 mm, a length-to-diameter ratio of 2.5, and a control component pressure of 90 kgf/cm$^2$. Nascent fiber is cooled and then oiled, and subjected to drafting treatment. A protofilament is subjected to two-level drafting with a total drafting ratio of 3.5, wherein the level-1 drafting rate of 2.8 is achieved at 77° C., and the level-2 drafting rate of 1.25 is achieved at 80° C. The drafted filament is then subjected to dynamic heat setting treatment at a heat setting temperature of 156° C. for 20s. The final fiber is wound at 3800 m/min.

The PET/PTT parallel complex filament prepared by using the above process has a monofilament linear density of 2 dtex, a breaking strength of 3.5 cN/dtex, a breaking elongation of 44%, an elastic recovery rate of 43%, and a crimping rate of 47%.

The above content is only a description of the preferred embodiments of the present invention, but should not be understood as a limitation to the claims.

The invention claimed is:

1. A method for preparing a PET/PTT parallel complex filament with high self-crimpiness, wherein PET and PTT are sliced, dried and crystallized, and then fused separately and subjected to extrusion molding through a parallel-type spinneret plate; oil is applied after cooling; then level 1-3 drafting and heat setting treatment are adopted; and during drafting, a total drafting rate is controlled to be 3 to 3.5, wherein the level-1 drafting rate is 2.8 to 3.0 at a temperature controlled to be 75 to 80° C., and the drafting rates of the remaining levels are 1.0 to 1.5 respectively at a temperature of 75 to 80° C.; the drafted filaments are subjected to dynamic heat setting treatment to obtain the PET/PTT parallel complex filament with high self-crimpiness, wherein an intrinsic viscosity of the PET raw material is 0.60 to 0.65 dL/g, an intrinsic viscosity of the PTT raw material is 0.90 to 0.96 dL/g, and a spinning temperature of a spinning molding is 270 to 275° C.; a winding rate of the fiber is 3600 to 3900 m/min; the dynamic heat setting refers that the filament is wound on a rotating heat roller or passed through a high-temperature hot plate to obtain transient setting; and the dynamic heat setting is performed at a temperature of 152 to 156° C. for 20s to 30s;
wherein the PET/PTT parallel complex filament with high self-crimpiness has a monofilament linear density of 2 to 3 dtex, a breaking strength of 3.2 to 3.5 cN/dtec, a breaking elongation of 25 to 45%, an elastic recovery rate of 40 to 45%, and a crimping rate of 45 to 49%.

2. The method for preparing the PET/PTT parallel complex filament with high self-crimpiness according to claim 1, wherein when the PET and PTT are subjected to melt extrusion and spinning molding, the two raw materials are metered by their respective melt metering pumps by virtue of independent and separate conveying and melting screws, then fed into the same spinning box at a mass ratio of PET to PTT of 55:45 at 270 to 275° C., and sprayed into filaments from a spinneret plate, wherein the used complex spinneret plate is a separated-type double-hole structure with a diameter of 0.3 mm, a length-to-diameter ratio of 2.5, and a control component pressure of 20 to 100 kgf/cm$^2$.

3. The method for preparing the PET/PTT parallel complex filament with high self-crimpiness according to claim 1, wherein the PET/PTT parallel complex filament with high self-crimpiness has a monofilament linear density of 2.4 dtex, a breaking strength of 3.4 cN/dtex, a breaking elongation of 40%, an elastic recovery rate of 41%, and a crimping rate of 47%.

4. The method for preparing the PET/PTT parallel complex filament with high self-crimpiness according to claim 1, wherein the intrinsic viscosity of the PET raw material is 0.63 dL/g, and the intrinsic viscosity of the PTT raw material is 0.95 dL/g; the two raw materials are dried and pre-crystallized in a drying tower, and then subjected to melt extrusion and spinning molding; the two raw materials are metered by their respective melt metering pumps by virtue of independent and separate conveying and melting screws, then fed into the same spinning box at a mass ratio of PET to PTT of 55:45 at 274° C., and sprayed into filaments from the spinneret plate, wherein the used complex spinneret plate has a separated-type double-hole structure with a diameter of 0.3 mm, a length-to-diameter ratio of 2.5, and a control component pressure of 90 kgf/cm$^2$; nascent fiber is cooled and then oiled, and subjected to drafting treatment; a protofilament is subjected to two-level drafting with a total drafting ratio of 3.5, wherein the level-1 drafting rate of 2.8 is achieved at 77° C., and the level-2 drafting rate of 1.25 is achieved at 80° C.; the drafted filament is then subjected to dynamic heat setting treatment at a heat setting temperature of 156° C. for 20s; and the final fiber is wound at 3800 m/min.

5. The method for preparing the PET/PTT parallel complex filament with high self-crimpiness according to claim 1, wherein the intrinsic viscosity of the PET raw material is 0.60 dL/g, and the intrinsic viscosity of the PTT raw material is 0.90 dL/g; the two raw materials are dried and pre-crystallized in a drying tower, and then subjected to melt extrusion and spinning molding; the two raw materials are metered by their respective melt metering pumps by virtue of independent and separate conveying and melting screws, then fed into the same spinning box at a mass ratio of PET to PTT of 55:45 at 270° C., and sprayed into filaments from the spinneret plate, wherein the used complex spinneret plate has a separated-type double-hole structure with a diameter of 0.3 mm, a length-to-diameter ratio of 2.5, and a control component pressure of 20 kgf/cm$^2$; nascent fiber is cooled and then oiled, and subjected to drafting treatment; a protofilament is subjected to two-level drafting with a total drafting ratio of 3, wherein the level-1 drafting rate of 2.8 is achieved at 75° C., and the level-2 drafting rate of 1.07 is achieved at 80° C.; the drafted filament is then subjected to dynamic heat setting treatment at a heat setting temperature of 152° C. for 20s; and the final fiber is wound at 3600 m/min.

6. The method for preparing the PET/PTT parallel complex filament with high self-crimpiness according to claim 1, wherein the intrinsic viscosity of the PET raw material is 0.65 dL/g, and the intrinsic viscosity of the PTT raw material is 0.96 dL/g; the two raw materials are dried and pre-crystallized in a drying tower, and then subjected to melt extrusion and spinning molding; the two raw materials are metered by their respective melt metering pumps by virtue of independent and separate conveying and melting screws, then fed into the same spinning box at a mass ratio of PET to PTT of 55:45 at 275° C., and sprayed into filaments from the spinneret plate, wherein the used complex spinneret plate has a separated type double-hole structure with a diameter of 0.3 mm, a length-to-diameter ratio of 2.5, and a control component pressure of 1.00 kgf/cm²; nascent fiber is cooled and then oiled, and subjected to drafting treatment; a protofilament is subjected to two-level drafting with a total drafting ratio of 3.5, wherein the level-1 drafting rate of 3.22 is achieved at 80° C., and the level-2 drafting rate of 1.09 is achieved at 80° C.; the drafted filament is then subjected to dynamic heat setting treatment at a heat setting temperature of 156° C. for 30s; and the final fiber is wound at 3900 m/min.

7. The method for preparing the PET/PTT parallel complex filament with high self-crimpiness according to claim 1, wherein the intrinsic viscosity of the PET raw material is 0.63 dL/g, and the intrinsic viscosity of the PTT raw material is 0.92 dL/g; the two raw materials are dried and pre-crystallized in a drying tower, and then subjected to melt extrusion and spinning molding; the two raw materials are metered by their respective melt metering pumps by virtue of independent and separate conveying and inciting screws, then fed into the same spinning box at a mass ratio of PET to PTT of 55:45 at 273° C., and sprayed into filaments from the spinneret plate, wherein the used complex spinneret plate has a separated-type double-hole structure with a diameter of 0.3 mm, a length-to-diameter ratio of 2.5, and a control component pressure of 80 kgf/cm²; nascent fiber is cooled and then oiled, and subjected to drafting treatment; a protofilament is subjected to three-level drafting with a total drafting ratio of 3.5, wherein the level-1 drafting rate of 3.1 is achieved at 75° C., the level-2 drafting rate of 1.1 is achieved at 78° C., and the level-3 drafting rate of 1.03 is achieved at 80° C.; the drafted filament is then subjected to dynamic heat setting treatment at a heat setting temperature of 154° C. for 25s; and the final fiber is wound at 3700 m/min.

8. The method for preparing the PET/PTT parallel complex filament with high self-crimpiness according to claim 1, wherein the intrinsic viscosity of the PET raw material is 0.64 dL/g, and the intrinsic viscosity of the PTT raw material is 0.95 dL/g; the two raw materials are dried and pre-crystallized in a drying tower, and then subjected to melt extrusion and spinning molding; the two raw materials are metered by their respective melt metering pumps by virtue of independent and separate conveying and melting screws, then fed into the same spinning box at a mass ratio of PET to PTT of 55:45 at 274° C., and sprayed into filaments from the spinneret plate, wherein the used complex spinneret plate has a separated-type double-hole structure with a diameter of 0.3 mm, a length-to-diameter ratio of 2.5, and a control component pressure of 60 kgf/cm²; nascent fiber is cooled and then oiled, and subjected to drafting treatment; a protofilament is subjected to level-1 drafting with a drafting ratio of 3.5; the drafted filament is then subjected to dynamic heat setting treatment at a heat setting temperature of 153° C. for 22s; and the final fiber is wound at 3800 m/min.

9. The method for preparing the PET/PTT parallel complex filament with high self-crimpiness according to claim 1, wherein the intrinsic viscosity of the PET raw material is 0.62 dL/g, and the intrinsic viscosity of the PTT raw material is 0.93 dL/g; the two raw materials are dried and pre-crystallized in a drying tower, and then subjected to melt extrusion and spinning molding, the two raw materials are metered by their respective melt metering pumps by virtue of independent and separate conveying and melting screws, then fed into the same spinning box at a mass ratio of PET to PTT of 55:45 at 275° C., and sprayed into filaments from the spinneret plate, wherein the used complex spinneret plate has a separated-type double-hole structure with a diameter of 0.3 mm, a length-to-diameter ratio of 2.5, and a control component pressure of 70 kgf/cm²; nascent fiber is cooled and then oiled, and subjected to drafting treatment; a protofilament is subjected to two-level drafting with a total drafting ratio of 3.4, wherein the level-1 drafting rate of 3.05 is achieved at 78° C., and the level-2 drafting rate of 1.11 is achieved at 80° C.; the drafted filament is then subjected to dynamic heat setting treatment at a heat setting temperature of 155° C. for 23s; and the final fiber is wound at 3900 m/min.

* * * * *